United States Patent [19]
Oles

[11] Patent Number: 5,672,031
[45] Date of Patent: Sep. 30, 1997

[54] MILLING CUTTER

[75] Inventor: Edward J. Oles, Ligonier, Pa.

[73] Assignee: Kennametal Inc., Latrobe, Pa.

[21] Appl. No.: 440,047

[22] Filed: May 12, 1995

[51] Int. Cl.⁶ ..................................................... B23C 5/00
[52] U.S. Cl. ................................ 407/35; 407/97; 407/119
[58] Field of Search ............................. 407/33, 35, 40, 407/41, 97, 114, 118, 119

[56] References Cited

U.S. PATENT DOCUMENTS

| | | | |
|---|---|---|---|
| 3,482,295 | 12/1969 | Trent | 29/95 |
| 3,733,665 | 5/1973 | Spriggs | 29/105 R |
| 3,739,442 | 6/1973 | Louendahl | 29/105 R |
| 3,792,524 | 2/1974 | Pomernacki | 29/567 |
| 3,813,748 | 6/1974 | Lindemann | 29/105 R |
| 3,872,561 | 3/1975 | Pomernacki | 29/95 |
| 4,194,860 | 3/1980 | Hopkins | 407/42 |
| 4,202,650 | 5/1980 | Erickson . | |
| 4,285,618 | 8/1981 | Shanely, Jr. | 407/54 |
| 4,330,227 | 5/1982 | Raye et al. | 407/36 |
| 4,575,287 | 3/1986 | Oshnock et al. . | |
| 4,687,387 | 8/1987 | Roos | 408/144 |
| 4,898,500 | 2/1990 | Nakamuras et al. | 407/62 |
| 4,936,718 | 6/1990 | Proffitt | 407/36 |
| 4,954,021 | 9/1990 | Tsujimura et al. | 407/35 |
| 4,990,036 | 2/1991 | Eklund et al. | 407/113 |
| 5,026,960 | 6/1991 | Slutz et al. | 407/114 X |
| 5,074,721 | 12/1991 | Kress et al. | 407/119 |
| 5,102,268 | 4/1992 | Mitchell | 407/36 |
| 5,139,372 | 8/1992 | Tanabe et al. | 407/118 |
| 5,156,501 | 10/1992 | Pawlik et al. | 407/48 |
| 5,186,583 | 2/1993 | Nakayama et al. | 407/39 |
| 5,188,490 | 2/1993 | Muendlein et al. | 408/146 |
| 5,193,948 | 3/1993 | Noggle | 407/116 |
| 5,236,740 | 8/1993 | Peters et al. | 427/249 |
| 5,240,356 | 8/1993 | Arai et al. | 407/33 |
| 5,256,008 | 10/1993 | Hansson et al. | 407/33 |
| 5,288,184 | 2/1994 | Heule | 408/224 |
| 5,292,213 | 3/1994 | Mussa et al. . | |
| 5,298,467 | 3/1994 | Hurtado et al. | 501/90 |
| 5,328,761 | 7/1994 | Omori et al. | 428/336 |
| 5,330,296 | 7/1994 | Beeghly et al. | 407/114 |
| 5,364,209 | 11/1994 | Santhanam et al. | 407/119 |
| 5,431,072 | 7/1995 | Christoffel | 76/115 |
| 5,585,176 | 12/1996 | Grab et al. | 428/336 |

FOREIGN PATENT DOCUMENTS

| | | |
|---|---|---|
| 0112957 A1 | 12/1982 | European Pat. Off. . |
| 0089545 A1 | 9/1983 | European Pat. Off. . |
| 0502834 B1 | 8/1996 | European Pat. Off. . |
| 7624228 | 2/1978 | France . |
| 2802395 A1 | 7/1978 | Germany . |
| 3540665 A1 | 5/1987 | Germany . |
| 4307716 A1 | 9/1994 | Germany . |
| 4423861 A1 | 12/1994 | Germany . |
| 4310303 | 11/1992 | Japan . |
| 9500272 | 1/1995 | WIPO . |

OTHER PUBLICATIONS

American National Standard B2124—1986.
Kennametal Milling 187 Catalog (1986) pagers 1, 2, 5, 6, 88, 92, 175–183.
Kennametal Brochure "KCD25 Diamond Film Coated Carbide Inserts" (1994).

Primary Examiner—Daniel W. Howell
Assistant Examiner—Henry W. H. Tsai
Attorney, Agent, or Firm—John J. Prizzi

[57] ABSTRACT

A milling cutter for milling a workpiece comprising a milling head rotatable about its central longitudinal axis. A milling head carries at least one milling insert of a first grade which presents a cutting edge. The milling head carries a wiper insert of a second grade which presents a wiping edge.

20 Claims, 2 Drawing Sheets

MILLING CUTTER

BACKGROUND OF THE INVENTION

The invention pertains to a milling cutter and cutting tools therein that provide improved performance features. More specifically, the invention pertains to a milling cutter that does not leave a burr on the workpiece after the completion of the milling operation and provides an acceptable workpiece surface finish. Furthermore, the invention concerns a method of milling that does not leave a burr on the workpiece after the completion of the milling operation and provides an acceptable workpiece surface finish.

Typically, a milling cutter comprises a milling head that holds a plurality of milling inserts that project forwardly of the forward face of the milling head. In operation, the milling head rotates and then engages the workpiece material so as to mill, i.e., remove material, from the workpiece. Common types of milling operations include face milling, end milling and slotting.

U.S. Pat. No. 4,202,650, to Erickson, for a SHIM LOCK FASTENER; U.S. Pat. No. 4,575,287, to Oshnock et al., for a MILLING CUTTER AND METHOD OF ASSEMBLY THEREFOR; and U.S. Pat. No. 5,292,213, to Massa, for a COUPLING DEVICE FOR HIGH-SPEED ROTATING, illustrate various styles of milling cutters. Furthermore, Kennametal catalog entitled "Kennametal Milling/1987" illustrates a variety of milling cutters and milling inserts.

One problem that exists in some milling operations is the presence of burrs on the milled surface of the workpiece after the completion of the milling operation. In the past, when using cemented carbide milling inserts, both coated and uncoated, the inclusion of a so-called wiper insert on the milling head helped reduce the problem of burrs. In these earlier arrangements, the wiper insert and the milling inserts were made from the same grade of cemented carbide. Furthermore, in these earlier arrangements the wiper insert was of a different geometric shape than the milling inserts.

In milling materials such as aluminum-silicon alloys, one type of milling insert comprises a cemented carbide substrate having a thin film diamond layer deposited thereon by chemical vapor deposition (CVD) techniques. In the past, when milling aluminum-silicon alloys using thin film diamond milling inserts there has existed a problem of burrs remaining on the milled surface of the workpiece. The presence of such burrs on the milled surface of the workpiece is undesirable. It would thus be desirable to provide a milling cutter that can mill a workpiece such as an aluminum-silicon alloy so as to not leave a burr on the milled surface thereof.

In the past, when milling a workpiece made of an aluminum-silicon alloy there has existed the problem of providing a milled surface with an adequate surface smoothness. This problem has been especially apparent when using thin film diamond milling inserts primarily because the surface of the diamond coating is microscopically rough faceted and this roughness causes rougher workpiece surface finishes. It would thus be desirable to provide a milling cutter than can mill a workpiece such as an aluminum-silicon alloy so as to provide a milled surface with an acceptable smoothness.

SUMMARY OF THE INVENTION

It is an object of the invention to provide an improved milling cutter.

It is another object of the invention to provide an improved milling cutter that mills a workpiece so as to not leave a burr on the milled surface of the workpiece.

It is still another object of the invention to provide an improved milling cutter that mills a workpiece so as to not leave a burr on the milled surface of the workpiece, and which produces a milled surface with adequate smoothness.

It is still another object of the invention to provide an improved milling cutter that mills an alloy such as an aluminum-silicon alloy so as to not leave a burr on the milled surface of the workpiece.

It is an object of the invention to provide an improved milling cutter that mills an alloy such as an aluminum-silicon alloy so as to not leave a burr on the milled surface of the workpiece, and which produces a milled surface with adequate smoothness.

It is another object of the invention to provide a method of milling for milling a workpiece so as to not leave a burr on the milled surface of the workpiece.

It is still another object of the invention to provide a method for milling a workpiece so as to not leave a burr on the milled surface of the workpiece, and which produces a milled surface with adequate smoothness.

It is still another object of the invention to provide a method for milling a workpiece made from an alloy such as an aluminum-silicon alloy so as to not leave a burr on the milled surface of the workpiece.

It is an object of the invention to provide a method for milling a workpiece made from an alloy such as an aluminum-silicon alloy so as to not leave a burr on the milled surface of the workpiece, and which produces a milled surface with adequate smoothness.

In one form thereof, the invention is a milling cutter for milling a workpiece that comprises a milling head rotatable about its central longitudinal axis. At least one milling insert is carried by the milling head and presents a cutting edge. A wiper insert is carried by the milling head and presents a wiping edge. The wiper insert is made of a grade different from that of the milling insert. Preferably, each milling insert is made of a first grade.

In another form thereof, the invention is a milling cutter for milling a workpiece that includes a milling head rotatable about its central longitudinal axis. At least one milling insert is carried by the milling head and presents a cutting edge. A wiper insert is carried by the milling head and presents a wiping edge. The wiping edge of the wiper insert is sharper than the milling edge of the milling insert.

In yet another form thereof, the invention is a milling cutter for milling a workpiece comprising a milling head rotatable about its central longitudinal axis. At least one milling insert is carried by the milling head and presents a cutting edge. A wiper insert is carried by the milling head and presents a wiping edge. The milling head includes a forward face. The wiping edge of the wiper insert projects a greater distance from the forward face of the milling head than does the cutting edge of each milling insert.

In another form thereof, the invention is a method of milling a workpiece comprising the steps of providing a milling head with a central longitudinal axis, and a forward face; providing at least one milling insert carried by the milling head wherein said milling insert is of one grade; providing a wiper insert carried by the milling head wherein the wiper insert is made from a grade different from the grade of said milling insert; rotating the milling head about its central longitudinal axis; moving the milling head and the workpiece relative to one another so that the milling head engages the workpiece so as to mill the workpiece; and moving the milling head and the workpiece relative to one another so that the milling head exits the workpiece thereby leaving the milled surface without a burr.

BRIEF DESCRIPTION OF THE DRAWINGS

The following is a brief description of the drawings that form a part of this patent application.

DETAILED DESCRIPTION OF PREFERRED EMBODIMENTS

Figure 1:
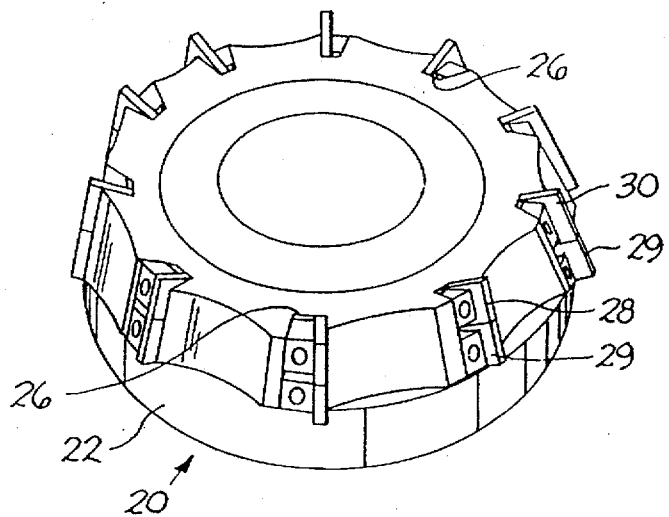
FIG. 1 is a perspective view of a specific embodiment of a milling cutter of the invention.

Referring to the drawings, FIG. 1 depicts a specific embodiment of the milling head of the invention, generally designated as 20. Milling head 20 comprises a generally cylindrical body portion 22 that contains a plurality of pockets 26. Each one of the pockets 26 receives its corresponding insert, which can be a milling insert 28 or a wiper insert 30. Each insert is detachably held in its respective pocket. Each one of the pockets also receives a corresponding nesting member 29.

Figure 3:
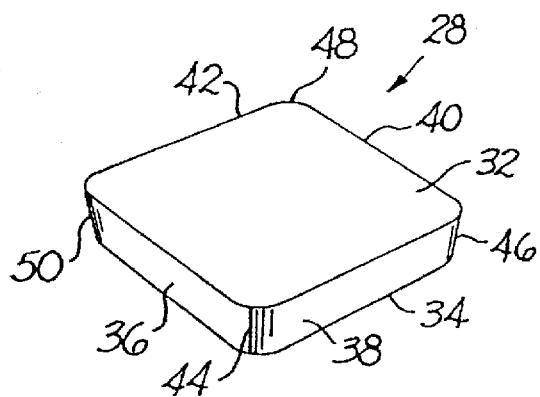
FIG. 3 is a perspective view of the thin film diamond milling inserts of the specific embodiment of FIG. 1.
Figure 4:
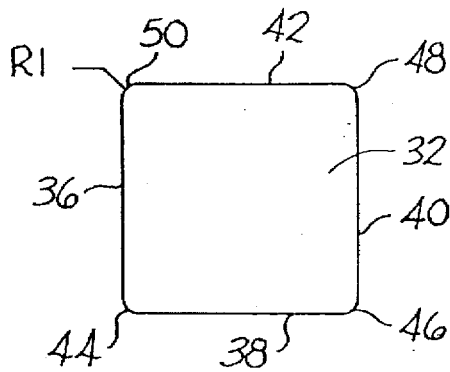
FIG. 4 is a top view of the milling insert of FIG. 3.
Figure 5:
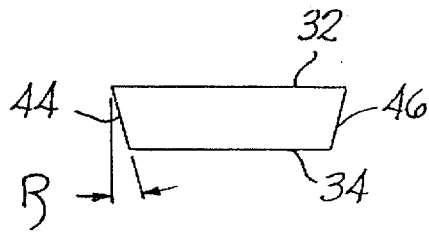
FIG. 5 is a side view of the milling insert of FIG. 3.

The milling insert 28 is of an SPGN-422 style of insert ("American National Standard for Cutting Tools—Indexable Inserts Identification System," ANSI Standard B212.4-1986), which is a two-nose radius insert. As shown in FIGS. 3 through 5, the milling insert 28 includes a top surface 32, a bottom surface 34, and four side surfaces 36, 38, 40 and 42. The joinder of adjacent side surfaces (36, 38, 40, 42) forms four corners (44, 46, 48, 50) that are radiused a radius "R1" 60 (see FIG. 4). The side surfaces (36, 38, 40, 42) are disposed at an angle "β" (see FIG. 5) with respect to a plane perpendicular to the top surface 32 that equals 11 degrees.

Milling insert 28 has a thin film of diamond thereon. Milling insert 28 is commercially available as a KCD25 insert from Kennametal Inc., of Latrobe, Pa. The thin diamond film style of milling insert is a subject of pending U.S. Pat. No. 5,585,176, filed on Nov. 30, 1993, entitled "DIAMOND COATED TOOLS AND PROCESS FOR MAKING," and assigned to the assignee of the present application. U.S. Pat. No. 5,585,176 is hereby incorporated by reference herein. KCD25 cutting inserts have a 25 to 30 μm thick diamond coating adherently bonded to a cemented tungsten carbide-cobalt substrate. The diamond coatings on the flank faces have been buffed to improve workpiece surface finish. Due to the nature of the process of applying the thin diamond film to the substrate of the insert, the cutting edges of the milling insert 28 are not as sharp as one would desire them to be. This is due to the fact that the substrate is honed and roughened prior to the application of the diamond coating. Although the milling insert of the specific embodiment has a thin diamond film thereon, there is no intention to limit the scope of the invention to this specific type of milling insert.

Figure 6:
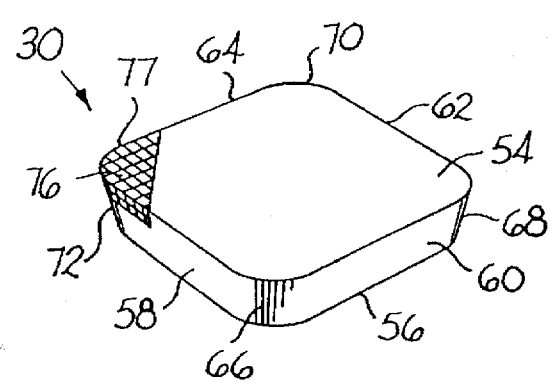
FIG. 6 is a perspective view of a wiper insert, which has a polycrystalline diamond composite tip, of the specific embodiment of FIG. 1.
Figure 7:
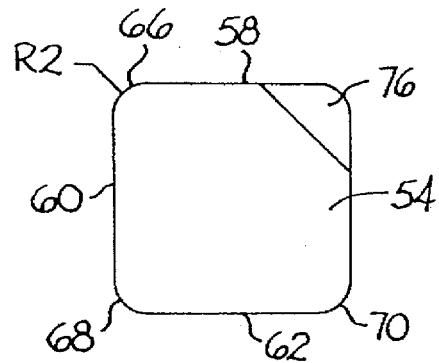
FIG. 7 is a top view of the wiper insert of FIG. 6.
Figure 8:
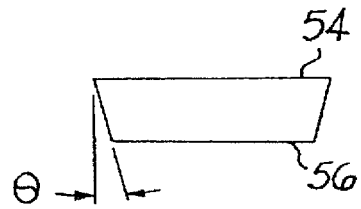
FIG. 8 is a side view of the wiper insert of FIG. 6.

Referring to FIGS. 6 through 8, these drawings illustrate an embodiment of a wiper insert 30. The specific insert 30 is a three-nose radius style of insert, and this insert functions as the wiper insert 30 in this specific embodiment. In this invention, a cutting insert of a standard milling insert geometry can function as a wiper insert if its nose radius is larger than the nose radius of the milling inserts. The use of a three-nose radius insert is not intended to limit the scope of the present invention. Inserts having a standard wiper insert geometry are within the contemplated scope of the invention.

Wiper insert 30 includes a top surface 54, a bottom surface 56, and four side surfaces 58, 60, 62, and 64. The joinder of adjacent side surfaces forms four corners 66, 68, 70 and 72 that are radiused a radius "R2" (see FIG. 7). As shown in FIG. 8, the side surfaces are disposed at an angle "θ" with respect to a plane perpendicular to the top surface 54 that equals 11 degrees.

Referring to FIGS. 6 and 7, the wiper insert 30 has a polycrystalline diamond tip 76 that defines the top cutting (or wiping) edge 77 thereof. The use of a polycrystalline diamond tip 76 results in a wiper insert 30 that has a very sharp wiping edge 77. The wiping edge 77 of the wiper insert 30 is sharper than the cutting edge of the milling insert 28.

Figure 2:
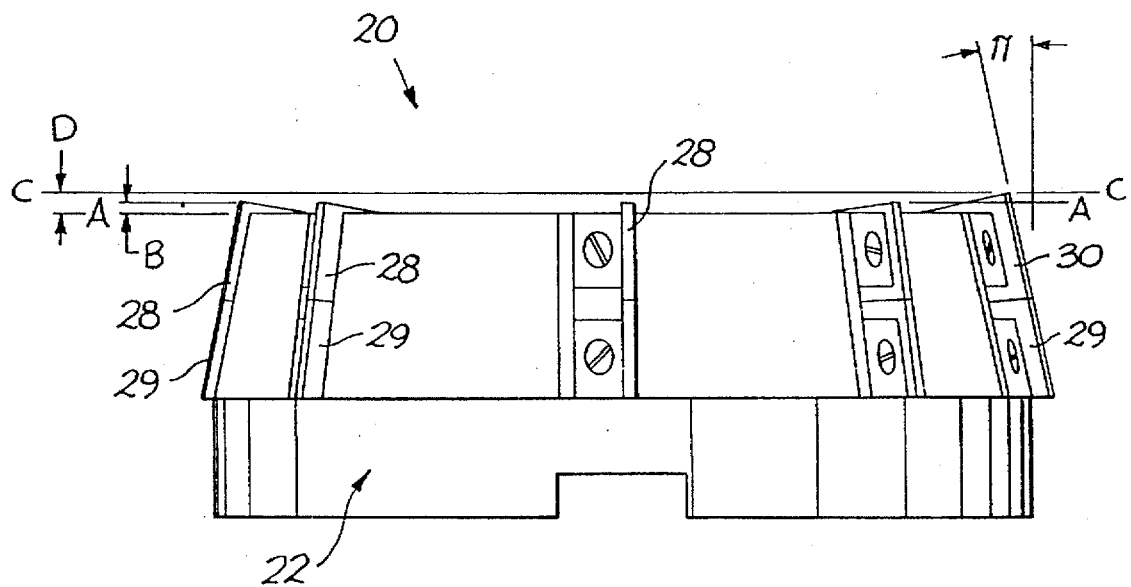
FIG. 2 is a side view of the specific embodiment of FIG. 1.

Referring to FIG. 2, the milling inserts 28 and the wiper insert 30 are disposed at an angle "π" with respect to the vertical axis equal to about 15 degrees. The highest corner of the milling insert 28 each lies in a generally horizontal plane A—A. This plane A—A is a distance B away from the forward face of the milling head. The highest corner of the wiping edge of the wiper insert 30 lies in a generally horizontal plane C—C. This horizontal plane C—C is a distance D away from the forward face of the milling head. Distance D is greater than distance B.

The present disclosure describes a specific embodiment of a milling cutter wherein there are three distinct differences between the milling inserts and the wiper insert. One area of difference lies in the grade of the inserts in that the wiper insert is a different grade from that of the milling inserts. A second area of difference lies in the sharpness of the cutting edges of the inserts in that the wiping edge of the wiper insert is sharper than the cutting edges of the milling inserts. A third area of difference lies in the distance the exposed cutting edges project from the forward face of the milling head in that the wiping edge projects a greater distance from the forward face than do the cutting edges of the milling inserts.

To demonstrate the effectiveness of the present invention, the following tests were conducted as described below. For all of the tests, the milling cutter used a SPGN-422 ("American National Standard for Cutting Tools—Indexable Inserts Identification System," ANSI Standard B212.4-1986) style milling insert, which is a two-nose radius insert, in fly cut milling. The workpiece material was bi-metallic in that there was an aluminum-silicon A356 alloy (11 weight percent Si) engine block with cast iron cylinder liners. In other words, the workpiece was an aluminum-ferrous material composite.

In one test (Test No. 1), a KCD25 milling insert (thin film diamond) of a SPGN-422 ("American National Standard for Cutting Tools—Indexable Inserts Identification System," ANSI Standard B212.4-1986) style milling insert, which is a two-nose radius insert, was in the milling position. A wiper insert was not employed in this test. The surface roughness of the milled workpiece aluminum alloy was 109 microinches $R_a$ with a slight burr. The KCD25 cutting insert is available from Kennametal Inc., of Latrobe, Pa. A Kennametal brochure (Catalog 4003), entitled "KCD25 Diamond Film Coated Carbide Inserts" (copyright 1994), further describes the KCD25 cutting insert.

In another fly cut milling test (Test No. 2), an up sharp KD100 (polycrystalline diamond, i.e., PCD) milling insert, which is available from Kennametal Inc., of Latrobe, Pa., was used. The KD100 milling insert has a 25 micrometer diamond grain size. The surface roughness of the milled workpiece was 56 microinches $R_a$ and burr formation was not observed. The workpiece specification called for a surface roughness of less than 60 microinches $R_a$ and no burr formation.

In another test (Test No. 3), a single KCD25 milling insert was used in the milling position and a single KCD25 milling insert was used in the wiper position. Both inserts were SPGN-422 style inserts. Results were as shown in Table I below.

TABLE I

| Number of Passes | Surface Roughness Microinches $R_a$ | Burr Formation |
|---|---|---|
| 10 | 87 | Yes |
| 20 | 80 | Yes |
| 30 | 110 | Yes |

In still another test (Test No. 4) a single KCD25 milling insert (SPGN-422 style insert, i.e., a two-nose radius insert) was used in the milling position and a single up-sharp KD100 PCD tool (SPGN-423 style insert), which is a three-nose radius insert, was used in the wiper position. The results of this test are listed in Table II.

TABLE II

| Number of Passes | Surface Roughness Microinches $R_a$ | Burr Formation |
|---|---|---|
| 10 | 35 | No |
| 20 | 37 | No |
| 30 | 40 | No |

In another test (Test No. 5), the milling insert was a single KCD25 (SPGN-422) tool and a three-nose-radius ceramic insert, made from Kennametal ceramic grade KYON 3500, and of a style SPGN-433T (sharp chamfered cutting edge) was employed in the wiper position. The KYON 3500 grade is a silicon nitride grade of material covered by U.S. Pat. No. 5,382,273, to Mehrotra et al., entitled SILICON NITRIDE CERAMIC AND CUTTING TOOL MADE THEREFROM. KYON 3500 cutting inserts are also commercially available from Kennametal Inc., of Latrobe, Pa. Table III sets out the results of this test.

TABLE III

| Number of Passes | Surface Roughness, Microinches $R_a$ | Burr Formation |
|---|---|---|
| 10 | 39 | No |
| 20 | 37 | No |
| 30 | 48 | No |

It is noteworthy that the inserts used in the wiper position of the cutter used in these tests were not "true" wiper inserts in that the "wiper" inserts used in these tests did not have wiper facets designed on the insert for this purpose. If a KCD25 faceted wiper insert had been employed in the wiper position, the workpiece finish would have been greater (or rougher) than specified, i.e., greater then 60 microinches $R_a$, and burr formation would still have occurred because the diamond coating surface of KCD25 is microscopically rough/faceted which imparts a rough finish to the workpiece. Hence, in applications where thin-film diamond coated tools (such as KCD25) are used in milling, position of the cutter, a sharp-edged tool of a wiper design, or a tool having a larger nose-radius (also sharp edged) than those used in milling position should be placed in the wiper position of the cutter to provide the desired surface finish and freedom from burr formation.

In the above tests, the highest corner of the wiping edge of the wiper insert was in a horizontal plane that was 0.0007 inches above the horizontal plane of the highest corner of the cutting edge of the milling insert. The milling conditions are set out below:

Speed=3500 feet per minute
Feed=0.008 inches per tooth
Depth of Cut=0.070 inches
Cross-head speed=20 inches per minute Dry
The cutter body: KDPR-8-SP4-15CB (see Kennametal Milling/1987 (copyright 1986) catalog, at Pages 22, 24 and 160)

All documents referred to in this specification are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A milling cutter for milling a workpiece comprising: a milling head rotatable about its central longitudinal axis; a thin film diamond coated milling insert being carried by the milling head and presenting a cutting edge, said milling insert being of a first grade of material; and a wiper insert being carried by the milling head and presenting a wiping edge, the wiper insert being of a grade of material different than that of said thin film diamond coated milling insert.

2. The milling cutter of claim 1 wherein the cutting edge of said diamond coated milling insert projects a first distance from the forward face of the milling head; the wiping edge of said wiper insert projecting a second distance from the forward face of the milling head; and the first distance being less than the second distance.

3. The milling cutter of claim 1 wherein the wiping edge of the wiper insert is sharper than the cutting edge of said milling insert.

4. The milling cutter of claim 1 wherein there is a plurality of said diamond coated milling insert.

5. The milling cutter of claim 1 wherein the wiper insert has a nose radius, said diamond coated milling insert has a nose radius, and the nose radius of the wiper insert is larger than the nose radius of said diamond coated milling insert.

6. The milling head of claim 1 wherein the wiper insert presents a polycrystalline diamond composite portion that defines the wiping edge.

7. The milling head of claim 6 wherein the workpiece is made of an aluminum-silicon alloy.

8. The milling head of claim 6 wherein the workpiece is made of an aluminum-silicon alloy-ferrous alloy composite.

9. The milling head of claim 1 wherein the wiper insert is a ceramic insert.

10. The milling insert of claim 9 wherein the wiper insert is a silicon nitride-based material.

11. A milling cutter for milling a workpiece comprising:
a milling head rotatable about its central longitudinal axis;
a milling insert being carried by the milling head and having a first nose radius;
a wiper insert being carried by the milling head and having a second nose radius; and
the second nose radius being larger than the first nose radius.

12. The milling cutter of claim 11 wherein the milling insert is made from a selected grade of material, and the wiper insert is made from a grade of material different from that of the milling insert.

13. The milling cutter of claim 11 wherein the milling head includes a forward face, the wiping edge of the wiper insert projects a greater distance from the forward face of the milling head than does the cutting edge of each said milling insert.

14. The milling cutter of claim 11 wherein the wiping edge of the wiper insert is sharper than the milling edge of said milling insert.

15. The milling cutter of claim 12 wherein said selected grade of material for said milling insert is a diamond coated cemented carbide-cobalt substrate.

16. The milling cutter of claim 15 wherein said grade of material of said wiper insert is a polycrystalline diamond composite.

17. The milling cutter of claim 15 wherein said diamond coated cemented carbide cobalt substrate has a coating thickness of 25 to 30 μm.

18. The milling cutter according to claim 12 wherein said grade of material of said wiper insert is a ceramic.

19. The milling cutter according to claim 15 wherein said grade of material of said wiper insert is a ceramic.

20. The milling cutter of claim 16 wherein said diamond coated cemented carbide cobalt substrate has a coating thickness of 25 to 30 μm.

* * * * *